(12) United States Patent
Yoshio et al.

(10) Patent No.: US 6,475,455 B2
(45) Date of Patent: Nov. 5, 2002

(54) MANUFACTURING METHOD OF SPINEL LITHIUM MANGANESE OXIDE FOR LITHIUM SECONDARY CELL

(75) Inventors: Masaki Yoshio, Saga; Hideyuki Noguchi, Saga-ken; Yasufumi Hideshima, Saga; Hiroyoshi Nakamura, Yame, all of (JP)

(73) Assignee: Saga Prefectural Regional Industry Support Center, Saga (JP)

( * ) Notice: Subject to any disclaimer, the term of this patent is extended or adjusted under 35 U.S.C. 154(b) by 20 days.

(21) Appl. No.: 09/809,490

(22) Filed: Mar. 15, 2001

(65) Prior Publication Data

US 2001/0046466 A1 Nov. 29, 2001

(30) Foreign Application Priority Data

Apr. 21, 2000 (JP) ........................................ 2000-161209

(51) Int. Cl.$^7$ ..................... C01D 15/00; C01G 45/00; C01G 49/00; C01G 51/00; C01G 53/00
(52) U.S. Cl. .................. 423/266; 423/599; 423/594
(58) Field of Search ................................. 423/599, 594, 423/266, 596, 518; 429/224; 252/519.1, 519.14, 519.15

(56) References Cited

U.S. PATENT DOCUMENTS 5,951,919 A * 9/1999 Hwang et al. ............... 423/599
6,168,888 B1 * 1/2001 Iwata et al. .................. 423/599
6,267,943 B1 * 7/2001 Manev et al. ............... 423/599

* cited by examiner

*Primary Examiner*—Steven Bos
(74) *Attorney, Agent, or Firm*—Jordqan and Hamburg LLP

(57) ABSTRACT

A manufacturing method of spinel type manganese oxide for a lithium ion secondary cell, includes pre-firing a mixture of lithium salt including lithium carbonate, manganese oxide, and heterogeneous metal, firing the mixture at 900 to 1200° C. to form a raw material, adding in the raw material at least one of crystal growth accelerators selected from the group consisting of lithium hydroxide, lithium sulfide and a mixture thereof, and firing the resulting compound at 750 to 850° C. to form an excess lithium heterogeneous metal-doped spinel compound having a BET specific surface area of 0.5 m$^2$/g or less.

10 Claims, No Drawings

MANUFACTURING METHOD OF SPINEL LITHIUM MANGANESE OXIDE FOR LITHIUM SECONDARY CELL

FIELD OF THE INVENTION

The present invention relates to a manufacturing method of an excess lithium type manganese-containing spinel compound having a low specific surface area for used in an active material of a positive electrode for a lithium ion secondary cell in which an intercalation compound, such as metallic lithium, lithium-carbon (lithium-graphite) or the like, serves as an active material of a negative electrode.

BACKGROUND OF THE INVENTION

In addition to $LiNiO_2$, $LiCoO_2$ and $LiMn_2O_4$ may be used as an active material for a positive electrode in a 4-volt, high-energy density type of lithium secondary cell. Some cells using $LiCoO_2$ as the active material of the positive electrode have been placed on the market. However, cobalt is not suitable for mass-production along with the popularization of such cells due to its limited resource and high-cost. In view of resource and cost, manganese compounds have promise as a material of the positive electrode. Manganese dioxide available for a raw material of the active material is mass-producing for materials of dry cells.

Spinel-structured $LiMn_2O_4$ has a weak side in that its capacity is degraded in the course of repeated charge/discharge cycles. Various approaches have been attempted to improve this drawback, such as addition of Mg, Zn or the like (Thackeray et al. Solid State Ionics, 69, 59 (1994)) or addition of Co, Ni, Cr or the like (Okada et al. Battery Technology, Vo. 5, (1993)), and its effectiveness has been clarified. However, Mn is materially dissolved in an electrolyte in high-temperature operation at 50° C. or more, and thereby the capacity is undesirably degraded in parallel with the charge/discharge cycles. Thus, it is difficult to maintain sufficient cycle life of the positive electrode only by simply doping the aforementioned metals.

SUMMARY OF THE INVENTION

The present invention has been embodied with a view to the aforementioned problems. Thus, it is an object of the present invention to provide a manufacturing method of a spinel-type manganese oxide for a lithium secondary cell, capable of improving high-temperature cycle characteristics by maintaining the features of lithium-rich spinel structure in which Li exists at the 16d site excellent in the cycle characteristics and reducing the specific surface area of. the lithium-rich spinel structure.

According to the present invention, there is provided a manufacturing method of a spinel type manganese oxide for a lithium ion secondary cell, comprising the steps of pre-firing a mixture of lithium salt including lithium carbonate, manganese oxide, and heterogeneous metal; firing said mixture at 900 to 1200° C. to form a raw material; adding in said raw material at least one of crystal growth accelerators selected from the group consisting of lithium hydroxide, lithium sulfide and a mixture thereof; and firing said resulting compound at 750 to 850° C. to form an excess lithium heterogeneous metal-doped spinel compound having a BET specific surface area of 0.5 m²/g or less.

In a specific embodiment, the doped metal may be a spinel compound substituted by Ni, Co, Fe, and Cu. Further, the excess lithium heterogeneous metal-doped spinel compound may have a composition of $Li_{1+x}Mn_{2+y-x}M_yO_{4-z}S_z$, where $0.01 \leq x \leq 0.10$, $0.01 \leq y \leq 0.20$, $0 < z \leq 0.05$.

Other features and advantages of the present invention will be apparent from the detailed description.

DESCRIPTION OF THE PREFERRED EMBODIMENT

It has been checked out that stoichiometric $LiMn_2O_4$ was transformed into a lithium-rich spinel compound having a low capacity as repeated charge/discharge cycles and gradually showed a stable capacity. It is a logical conclusion that lithium-rich spinel provides better cycle characteristics, and this has been experimentally verified (Yoshio et al. J. Electrochem. Soc., 143, 625 (1996)). However, as Li/Mn ratio is increased, the capacity is degraded and the availability for the material of the positive electrode will be eventually gone off. As described above, the heterogeneous metal-dope is also effective to improve the cycle characteristic. In this case, lager capacity may be obtained by forming the 16d site with Li, Mn, and M (Ni, Co, Fe, Cr, and Cu) as compared with the case of simply constructing with Li and Mn.

On the other hand, when the active material is dissolved in a high-temperature electrolyte, reduced reaction area obviously allows the dissolved amount of manganese to be lowered so that the high-temperature cycle characteristics may be enhanced. Otherwise, improved high-temperature cycle characteristics may be expected by compounding the positive electrode through high-temperature firing capable of enhancing sintering and crystal growth. However, when the firing temperature is simply increased, an oxygen-defect type spinel compound is created which is inferior in the high-temperature cycle characteristics due to a voltage plateau around 3.3 V.

It has been discovered that a material of a grown crystal structure having a narrow line width of XRD diffraction patterns and 0.5 m²/g or less of specific surface area evaluated by BET method was provided by mixing a pre-mixed spinel compound with lithium hydroxide and then firing to form an excess lithium spinel compound. This proves that the lithium hydroxide acts as a crystal growth accelerator. It has also been verified that the same effect was yielded by lithium sulfide and a mixture of lithium sulfide and lithium hydroxide as well as lithium hydroxide. This result has been applied to a method for manufacturing a heterogeneous metal-doped spinel compound excellent in the high-temperature characteristics.

While a spinel compound having a smaller specific surface area may be obtained by compounding through firing at 900° C. or more a heterogeneous metal-doped spinel compound in which the 16d site is formed of Li, Mn, and M (Ni, Co, Fe, Cr, and Cu), an oxygen-defect spinel structure is generally created and thereby the high-temperature cycle characteristics is deteriorated. Generally, when a pure spinel compound formed only of manganese is fired at about 750° C. of firing temperature, 0.5 to 1% of the 16d site involves cation defect (Yoshio et al. J. Power Sources, 77, 198 (1999)). In contrast, according to the method of the present invention, the spinel compound is compounded at 900° C. or more of high temperature so that no cation-defect type spinel compound may be provided. When this raw material is re-fired after adding lithium hydroxide, lithium sulfide, or a mixture thereof as a crystal growth accelerator, an excess lithium type spinel structure having excellent cycle characteristics, a large crystal having a grown crystal structure, and small specific surface area are desirably provided.

In particular, if lithium hydroxide and lithium sulfide are used together as a crystal growth accelerator, a more desirable compound is provided with a smaller surface than that resulting from using only lithium hydroxide and with sulfur substituted for a part of oxygen.

As in embodiments 1 to 6 described below, the material compounded by the manufacturing method according to the present invention has an excellent high-temperature cycle characteristic suitable for a material of cells used in electric vehicles and the like, which are forced to operate under high temperature.

Embodiment 1

Lithium carbonate, electrolytic manganese dioxide, nickel acetate were mixed by a mole ratio of 0.5:1.90:0.10 and then powdered. After heating at 600° C. for 5 hours, the material was further heated at 1000° C. for 10 hours or more. After cooling, the material was powdered to provide a spinel compound of raw material. Lithium hydroxide corresponding to 5 mol % of this raw material was added to the raw material and the mixture was fired at 800° C. for 10 hours. The specific surface area of this sample was 0.1 m$^2$/g.

A film binder was formed with the sample of 25 mg and a conductive binder of 10 mg, and applied onto a stainless mesh to provide a positive electrode. The positive electrode was used after drying. Metallic lithium was used as a negative electrode, and LiPF$_6$-EC·DMC (1:2 of volume ratio) was used as an electrolyte. Charge/discharge current was set in 0.25 mA (0.1 mA/cm$^2$), and charge/discharge voltage was set in the range of 4.5 to 3.5 V. A charge/discharge test was carried out at 50° C. The following other embodiments were carried out under the same condition as that described above. An initial discharge capacity of this sample was 103 mA h/g or more, and the decrease rate of the capacity up to 50 cycles was 0.04% or less.

Embodiment 2

Lithium hydroxide corresponding to 5 mol % and lithium sulfate corresponding to 2.5 mol % of a raw material 1 same as that in the embodiment 1 were added to the raw material 1. After powdering and mixing, the mixture was fired at 800° C. for 10 hours or more. The specific surface area of this sample was 0.2 m$^2$/g. As a result of chemical analysis, the composition of this compound was $Li_{1.08}Mn_{1.87}Ni_{0.10}O_{3.98}S_{0.02}$.

An initial discharge capacity of this sample was 103 mA h/g or more, and the decrease rate of the capacity up to 50 cycles was 0.05% or less.

Embodiment 3

Lithium hydroxide, electrolytic manganese dioxide, tricobalt tetraoxide were mixed by a mole ratio of 0.5:1.90:0.10 and then powdered. After heating at 600° C. for 5 hours, the material was further heated at 1000° C. for 10 hours or more. After cooling, the material was powdered to provide a spinel compound of raw material. Lithium hydroxide corresponding to 5 mol % of this raw material was added to the raw material and the mixture was fired at 800° C. for 10 hours. The specific surface area of this sample was 0.2 m$^2$/g. An initial discharge capacity of this sample was 118 mA h/g or more, and the decrease rate of the capacity up to 50 cycles was 0.05% or less.

Embodiment 4

Lithium hydroxide, electrolytic manganese dioxide, cobalt nitrate were mixed by a mole ratio of 0.5:1.90:0.10 and then powdered. After heating at 600° C. for 5 hours, the material was further heated at 1000° C. for 10 hours or more. After cooling, the material was powdered to provide a spinel compound of raw material. Lithium hydroxide corresponding to 5 mol % of this raw material was added to the raw material and the mixture was fired at 800° C. for 10 hours. The specific surface area of this sample was 0.5 m$^2$/g.

An initial discharge capacity of this sample was 118 mA h/g or more, and the decrease rate of the capacity up to 50 cycles was 0.05% or less.

Embodiment 5

Lithium carbonate, manganese dioxide, iron nitrate were mixed by a mole ratio of 0.5:1.90:0.10 and then powdered. After heating at 600° C. for 5 hours, the material was further heated at 1000° C. for 10 hours or more. After cooling, the material was powdered to provide a spinel compound of raw material. Lithium hydroxide corresponding to 5 mol % of this raw material was added to the raw material and the mixture was fired at 800° C. for 10 hours. The specific surface area of this sample was 0.2 m$^2$/g.

An initial discharge capacity of this sample was 118 mA h/g or more, and the decrease rate of the capacity up to 50 cycles was 0.05% or less.

Embodiment 6

Lithium carbonate, manganese dioxide, copper nitrate were mixed by a mole ratio of 0.5:1.90:0.10 and then powdered. After heating at 600° C. for 5 hours, the material was further heated at 1000° C. for 10 hours or more. After cooling, the material was powdered to provide a spinel compound of raw material. Lithium hydroxide corresponding to 5 mol % of this raw material was added to the raw material and the mixture was fired at 800° C. for 10 hours. The specific surface area of this sample was 0.3 m$^2$/g. An initial discharge capacity of this sample was 102 mA h/g or more, and the decrease rate of the capacity up to 50 cycles was 0.04% or less.

A highly crystalline, heterogeneous metal-substituted or sulfur-substituted, lithium rich spinel manganese oxide manufactured by the method according to the present invention has a function as a positive electrode of lithium secondary cells and an excellent high-temperature cycle characteristic. Thus, this lithium rich spinel manganese oxide is useful for an active material of a positive electrode in lithium ion cells or lithium secondary cells, which are used under hot environment caused by a CPU of a computer, such as a power source of a notebook computer, or under other various high temperature environments.

The present invention has been described in connection with the specific embodiments. However, many other variations and modifications may be made without departing from the concept of the present invention. Accordingly, it should be clearly understood that the foregoing embodiments are illustrative only and are not intended as limitations on the scope of the invention.

What is claimed is:

1. A manufacturing method of a lithium manganese oxide spinel for a lithium ion secondary cell, comprising the steps of:

pre-firing a mixture of lithium sat including lithium carbonate, manganese oxide, and a heterogeneous metal;

firing said mixture at 900 to 1200° C. to form a raw material;

adding to said raw material at least one crystal growth accelerator selected from the group consisting of lithium hydroxide, lithium sulfide and a mixture thereof to form a resulting compound; and firing said resulting compound at 750 to 850° C. to form an excess lithium heterogeneous metal-doped lithium manganese oxide spinel compound having a BET specific surface area of 0.5 m$^2$/g or less.

2. A manufacturing method of a lithium manganese oxide spinel for a lithium ion secondary cell, as defined in claim 1, wherein said heterogeneous metal is Ni, Co, Fe, or Cu.

3. A manufacturing method of a lithium manganese oxide spinel for a lithium ion secondary cell, as defined in claim 1 or 2, wherein said excess lithium heterogeneous metal-doped spinel compound has a composition of $Li_{1+x}Mn_{2-y-x}M_yO_{4-z}S_z$, where $0.01 \leq x \leq 0.10$, $0.01 \leq y \leq 0.20$, $0 < z \leq 0.05$ and wherein M is Ni, Co, Fe, or Cu.

4. The method of claim 2 wherein said heterogeneous metal is Ni.

5. The method of claim 2 wherein said heterogeneous metal is Co.

6. The method of claim 2 wherein said heterogeneous metal is Fe.

7. The method of claim 2 wherein said heterogeneous metal is Cu.

8. The method of claim 1 wherein said accelerator is lithium hydroxide.

9. The method of claim 1 wherein said accelerator is lithium sulfide.

10. The method of claim 1 wherein said accelerator is a mixture of lithium hydroxide and lithium sulfide.

* * * * *